(12) United States Patent
Tosun

(10) Patent No.: US 11,746,797 B1
(45) Date of Patent: Sep. 5, 2023

(54) 2-PIECE AXIAL FAX BLADE DESIGNED FOR COOLING TOWER

(71) Applicant: GT KARBON IZLEME VE ENERJI VERIMLILIGI SANAYI TICARET ANONIM SIRKETI, Istanbul (TR)

(72) Inventor: Savas Tosun, Istanbul (TR)

(73) Assignee: GT KARBON IZLEME VE ENERJI VERIMLILIGI SANAYI TICARET ANONIM SIRKETI, Istanbul (TR)

( * ) Notice: Subject to any disclaimer, the term of this patent is extended or adjusted under 35 U.S.C. 154(b) by 10 days.

(21) Appl. No.: 17/832,736

(22) Filed: Jun. 6, 2022

(30) Foreign Application Priority Data

Mar. 8, 2022 (TR) ................................ 2022/003439

(51) Int. Cl.
*F04D 29/32* (2006.01)
*F04D 19/00* (2006.01)

(52) U.S. Cl.
CPC ......... *F04D 29/325* (2013.01); *F04D 19/002* (2013.01)

(58) Field of Classification Search
CPC .............................. F04D 19/002; F04D 29/325
See application file for complete search history.

(56) References Cited

FOREIGN PATENT DOCUMENTS

| CA | 2850719 A1 | * | 4/2013 | ............... B29D 7/01 |
| DE | 29601634 U1 | | 4/1996 | |
| EP | 3179093 A1 | | 6/2017 | |
| RU | 2145004 C1 | | 1/2000 | |
| TR | 202008559 A2 | * | 1/2021 | ........... F03D 1/0675 |
| TR | 202008559 A2 | | 1/2021 | |

OTHER PUBLICATIONS

Machine Translation of TR202008559A2 PDF file name: "TR202008559A2_Machine_Translation.pdf."*

* cited by examiner

*Primary Examiner* — Grant Moubry
*Assistant Examiner* — Ruben Picon-Feliciano
(74) *Attorney, Agent, or Firm* — Bayramoglu Law Offices LLC

(57) ABSTRACT

A 2-piece axial fan blade designed for a cooling tower includes an upper wing and a lower wing, in which the upper wing includes an upper wing upper profile and an upper wing lower profile at a first torsion angle, and the lower wing includes an lower wing upper profile and a lower wing lower profile arranged so that the lower wing has a second torsion angle parallel to the upper wing. The upper wing further includes a decoupled twin profile rod fixed between the upper wing upper profile and the upper wing lower profile. The lower wing upper profile and the lower wing lower profile are parallel to a direction of extension of wing profiles.

1 Claim, 4 Drawing Sheets

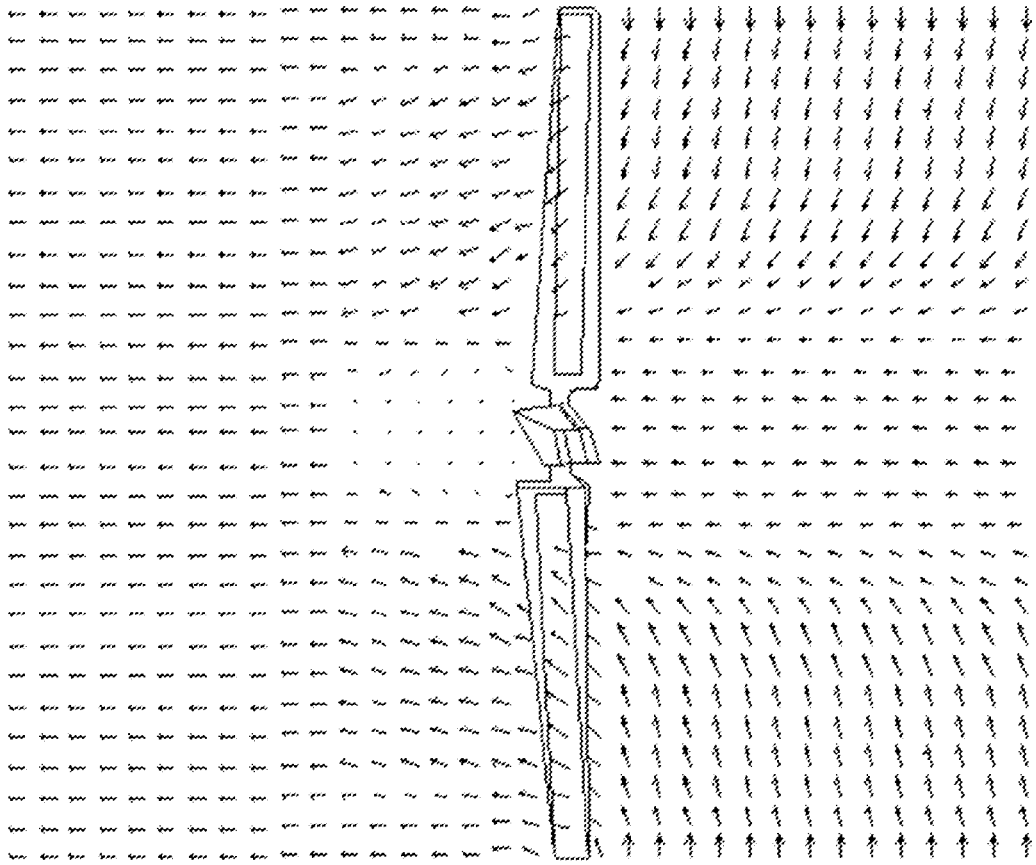
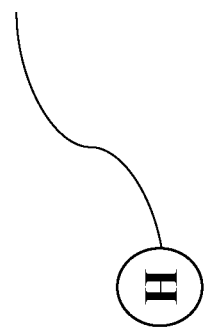
FIG. 4
PRIOR ART

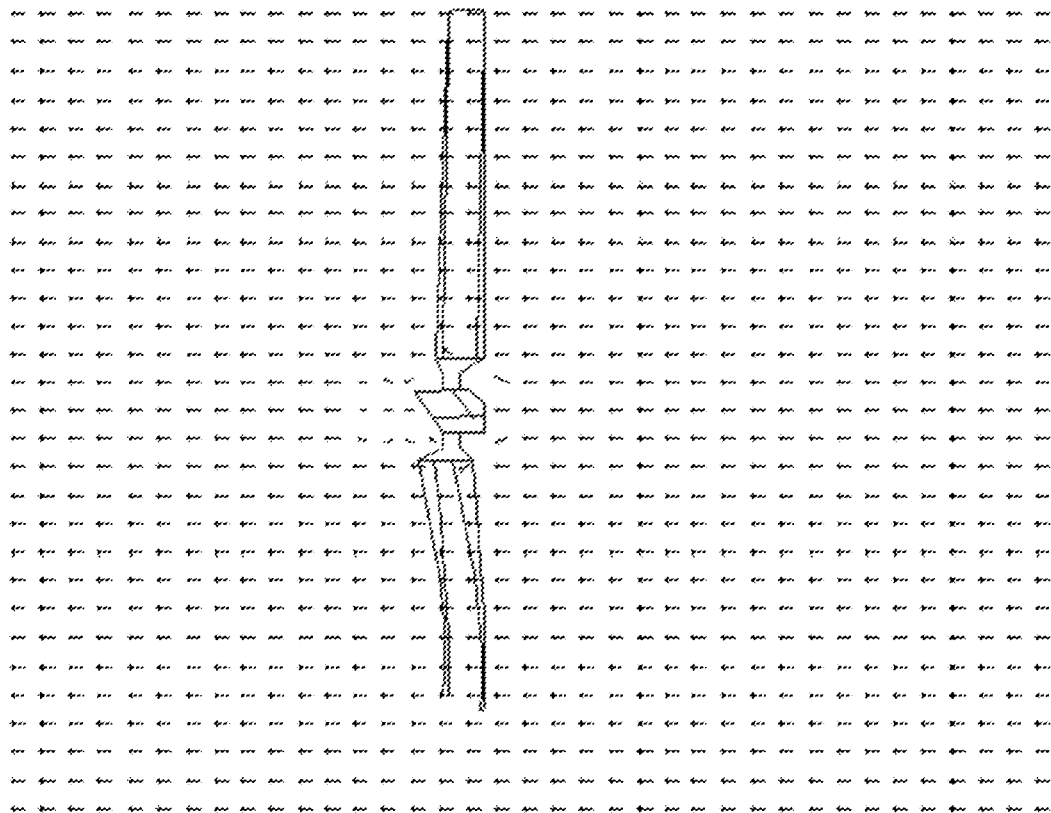
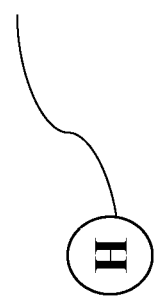
FIG. 5

2-PIECE AXIAL FAX BLADE DESIGNED FOR COOLING TOWER

CROSS REFERENCE TO THE RELATED APPLICATIONS

This application is based upon and claims priority to Turkish Patent Application No. 2022/003439, filed on Mar. 8, 2022, the entire contents of which are incorporated herein by reference.

TECHNICAL FIELD

The presented invention relates to a fan blade and relates in particular to the wing structure of fans used in cooling towers.

BACKGROUND

Cooling towers are an important element in the sense of cooling power stations. They take on the task of removing unwanted heat from the hot water toe coming out of the process into the atmosphere and removing this heat trapped in the system. The water in the reservoir replaces the evaporated water, and the heated water is transferred to the condenser and cooled again. Machine equipment operating under high loads in the process is subjected to friction, etc., when it heats, it is cooled by cold liquid, and equipment damage caused by high heat is prevented.

In cooling towers, hot fluids are cooled by condensers, and at the same time, their heat can be released to the atmosphere in accordance with the use of fans. The cooling function in these towers is generally realized as follows: hot water is sprayed from the top point of the tower to the inside of the tower with nozzles, and this hot water is drawn from the top of the tower by the vacuum effect created by the fan, ensuring that contact with cold air is achieved by heat transfer. Here, in order for the heat transfer to have the maximum effect, it is necessary to ensure that the water droplets fall from the cooling tower to the point down at the minimum speed. Because hot water should come into contact with cold air as much as possible, in other words, it is necessary that the hanging time in the air is long.

It is necessary to carefully select the design values of the airfoil profiles of fans used in cooling towers because these design values play an important role in the function of aerodynamically sweeping the air and attracting the air. The wing profiles used in wind turbines and the wing profiles used in cooling towers should not be confused with each other. Wind turbines are intended to generate electricity by rotating the shaft mechanism by contacting air as much as possible, while the wing profiles used in cooling towers are responsible for ensuring that hot water is in contact with air as much as possible using electrical energy. The important point here is that the contact of water with air should occur in such a way that the water droplets should not reach the top of the cooling tower, but they should not fall fast to the floor. That is to say, an excess vacuum effect applied to the air can cause water to hit the engine fan equipment at the top of the cooling tower, causing these equipment to short out. With a low vacuum effect, the water reaches the floor quickly and does not cool down properly because it cannot come into contact with cold air for optimal periods of time. Therefore, it is important to select the wing fan profiles to be used in cooling towers in the appropriate design parameters.

Another important parameter in cooling towers is the consumption of electricity. Since these fans do not produce electricity, but rather consume electricity, an increase in electricity consumption may affect the manufacturer. Therefore, it is necessary to be able to create a positive effect in the direction of rotation of the wings. This is possible with changes in parameters such as wing chord lengths, attack angles, wing dip/tip ratios, torsion angles of wing profiles.

The resistance of the fan blades working in the towers against vibrations is also important. Since vibrations create swing oscillating effect, the life of the wing profiles can be directly affected, especially in operating conditions up to 600 RPM, cracks, breakages and tearage may occur at the connection points of the profiles and profile surfaces after long-term use of these wings. Especially such events occur on fans operating with a single airfoil.

In the patent application EP3179093A1, a rotor blade designed for a wind turbine is mentioned. The invention also relates to a sub-element adapted to extend from an inner end to an outer end and thereby form a separate section of the longitudinal extension of the wing element of a rotor blade for a wind turbine.

In the above application, the wing profiles are designed for a wind turbine and produce electricity. The wing profiles are connected to each other in such a way as to form a triangular form, and it is intended to contact the air as much as possible.

In the utility model application DE29601634U1, a windbreaker is described. The invention relates to a wind turbine having a single wing rotating oppositely to each other mounted to rotate circularly on the chassis and includes two horizontal shafts associated with two generators with double spur gears or belts with straight grooves. The wind turbine design also includes a dynamic centrifugal system with decircular discs resting on the axis of rotation between the rotor blade and the counterweight. In addition, the rotor blade construction has a lightweight design, the rotor blade can be extended to the front and rear wing.

In the reference to the utility model dec above, the fan blade is mentioned, which has three wing profiles with a flat design and is connected to each other by an intermediate beam. This application is likewise for electricity generation purposes. Although the wings that will work in wind turbines work at low deceleration rates (low speed with large torque), it is aimed to increase the strength by placing beams between the wings.

The patent application TR202008559, which belongs to the applicant, describes a multi-profile, girder and efficient axial fan. The present invention is used in the air circulation of cooling towers, car radiators, farm ventilation, air conditioning systems, propellers of aircraft (aircraft, helicopter, drone) and wind turbines.

In the above invention of the applicant, a fan blade with a profile of three wings is described. The purpose of using the center wing profile located in the central part of the three-wing profile is to prevent turbulence, as well as to support the upper and lower wings by providing the use of beams. However, since the fan blades in the cooling towers operate at high rpm (around 600 RPM), cracks and dislocation of the beams are observed during oscillations caused by high vibrations during long-term use. This leads to major damage to the wings and directly affects their working efficiency. In addition, the applied wing causes the torsion angle (twist) to be unable to vacuum equal air from all points of the tower.

The patent application RU2145004C1 describes the axial flow fan composite vane. The present invention relates in particular to blades with composite material used for impellers of large diameter axial fans, which can be used in cooling towers.

In the above application, two I-section power profiles placed inside a fan airfoil made of composite material were mentioned. It is seen that the inner part of the profile is filled with polyurethane foams in order to prevent resonances that may occur due to the fact that the two power profiles are located in a certain opening. Profiles also have a straight angle.

SUMMARY

The structures according to the present technique, the subject matter of the invention is provided on our flank key features fan; cooling towers to prevent the resonance of the fan according to the values that varies in RPM, Air flow rate to get more power with less input, operating at high rpm, the vibration of the airfoil oscillating movement to increase the resistance, the service life of the wing profile three-point move to the consumption of electricity consumption of up to 50% in for download.

It is known that the fact that the wing profiles have a flat structure from the beginning to the end leads to a loss in the working efficiency of the fan. Therefore, an auger angle (twist) is provided to the wing profiles, especially for the purpose of sweeping the air and separating it from the system. However, most sources do not have an exact solution for how many degrees these auger angles will be. Because the angle of the auger to be applied to the design may also vary depending on the technical area in which the wing profile will be used. Since the wing structure subject to our invention is designed specifically for cooling liquid fluid in cooling towers, the design value of the 35-degree auger angle allows air to be drawn through the tower by vacuum and the incoming air to be swept into the atmosphere without stopping the wings. In addition, this 35-degree auger angle was not applied from the stem to the bottom of the wing and was only applied at 90% of the wing length. The remaining parts have a straight angle of 0 degrees. The 15-degree angle of rotation mentioned in the invention TR202008559, which belongs to the applicant, is a value obtained by conducting experimental studies due to the three airfoil and beam structures between them. However, due to the fact that there are two wings in the new system that is the subject of our invention, the angle of 35 degrees was found appropriate according to this system, since the amount of air that the wings will sweep will vary. Therefore, there is no need for an additional airfoil, and the air flow rate applied to each surface of the wing is equal at all points.

One of the most important advantages of our invention is the adjacent twin rod profiles placed inside the two parts that make up the wing profile. These rod profiles placed in the inner part are made of UD 0-degree directional carbon fiber fabric, and its most important advantage is that it is quite strong, flexible, and lightweight. The main reason for choosing this material is that it can easily take the shape of the wing when it is combined with these profiles after the wing profiles are manufactured. The wing profiles are not torsional in this regard. The main reason why the bar profiles are in an adjacent twin structure is to increase the strength and prevent the inside of the wing profiles from being covered with internal filler. Therefore, the inside of our wing profiles is hollow, without filler. These power profiles basically reduce the oscillation and increase the life of the wing structure by getting ahead of the currently used beam system.

BRIEF DESCRIPTION OF THE DRAWINGS

The invention will be described with reference to the accompanying figures, so that the features of the invention will be more clearly understood and appreciated, but the purpose of this is not to limit the invention to these certain regulations. On the contrary, it is intended to cover all alternatives, changes and equivalences that can be included in the area of the invention defined by the accompanying claims. The details shown should be understood that they are shown only for the purpose of describing the preferred embodiments of the present invention and are presented in order to provide the most convenient and easily understandable description of both the shaping of methods and the rules and conceptual features of the invention. In these drawings:

FIG. 4 shows changes in the air flow inside the tower caused by the wing profiles belonging to the known state of the technique.

FIG. 5 shows the changes created by the wing profiles in the airflow inside the tower.

Figure 1:
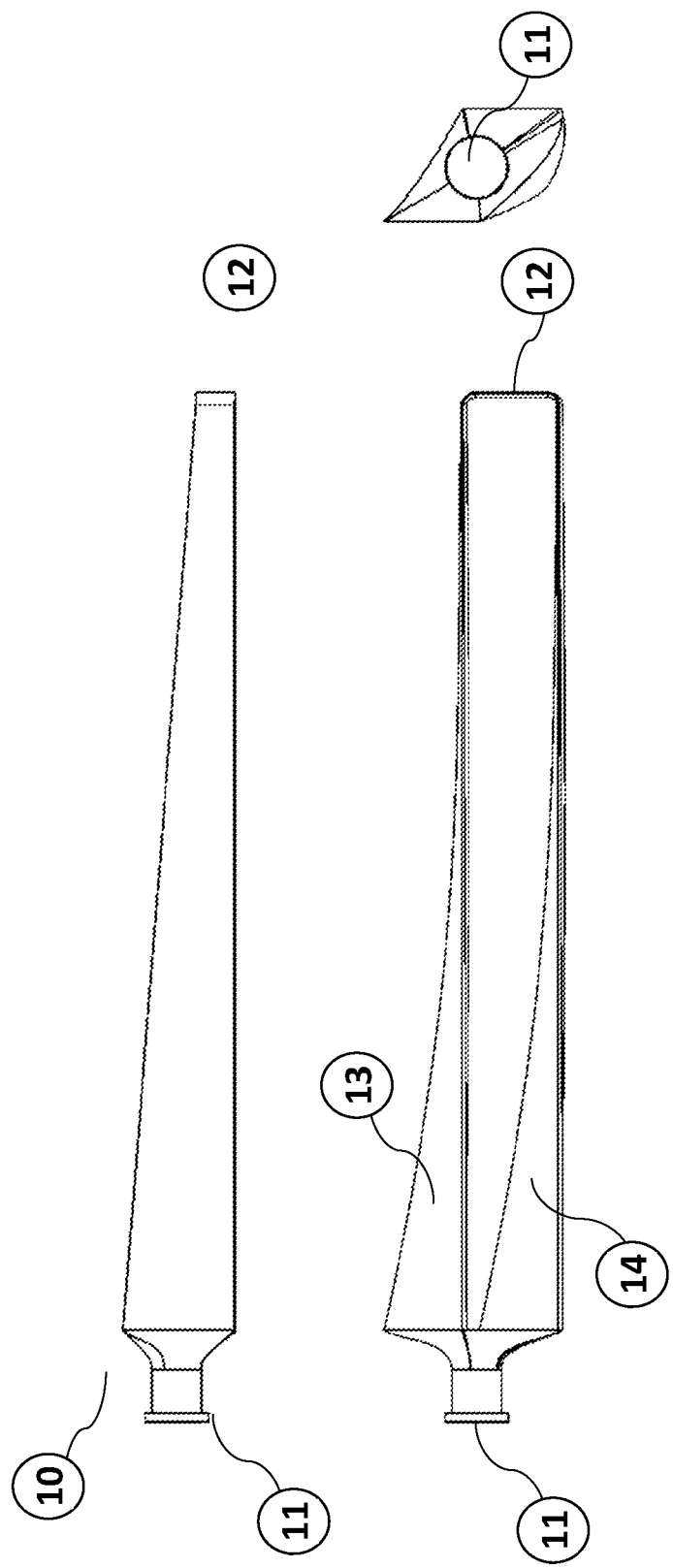
FIG. 1 shows front, bottom, and side views of the wing.

The figures to help understand the present invention are numbered as indicated in the attached image and are given below along with their names.

DESCRIPTION OF REFERENCES

10. Wing
11. Handle part
12. Head
13. Upper wing
14. Lower wing
15. Profile rod
131. Upper wing upper profile
132. Upper wing lower profile
141. Lower wing upper profile
142. Lower profile lower wing
L. Wing length
H. Direction of air flow

DETAILED DESCRIPTION OF THE EMBODIMENTS

In FIG. 1, the wing (10) included in the invention is mainly composed of the handle part (11), the head (12), the upper wing (13), the lower wing (14) and the profile rod (15). The upper wing (13) also consists of the upper wing upper profile (131) and the upper wing lower profile (132) structures, while the lower wing (14) consists of the lower wing upper profile (141) and the lower wing lower profile (142) parts.

Figure 2:
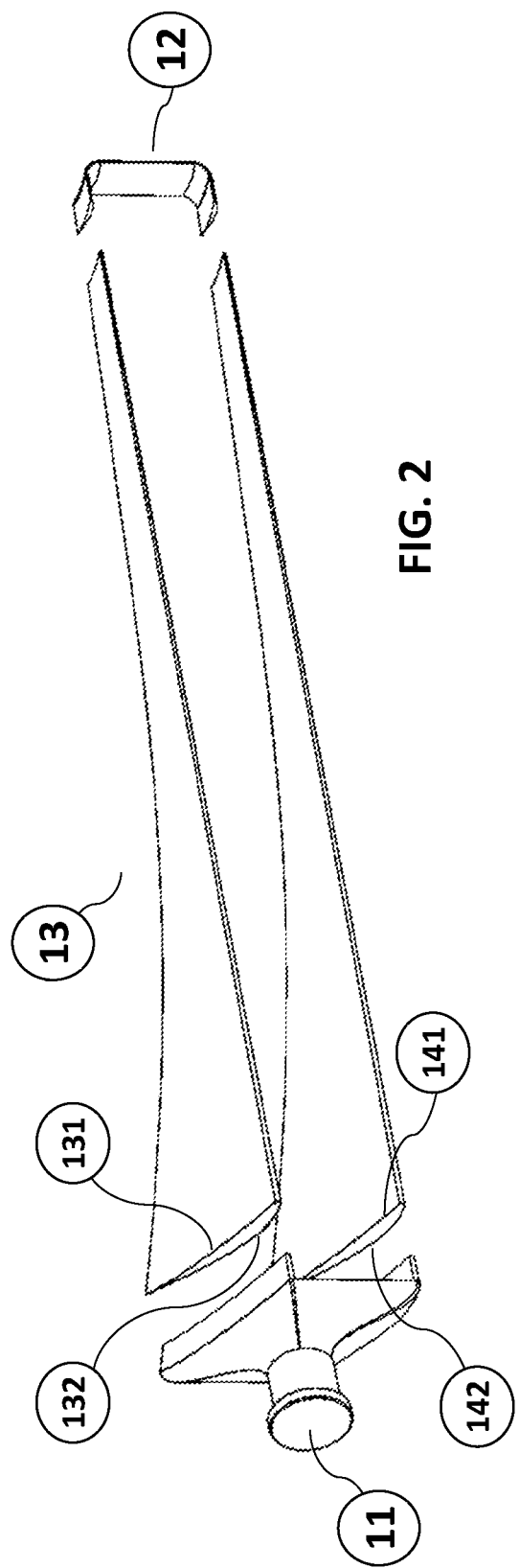
FIG. 2 is a view of the wing that shows the exploded mounting view in perspective.
Figure 3:
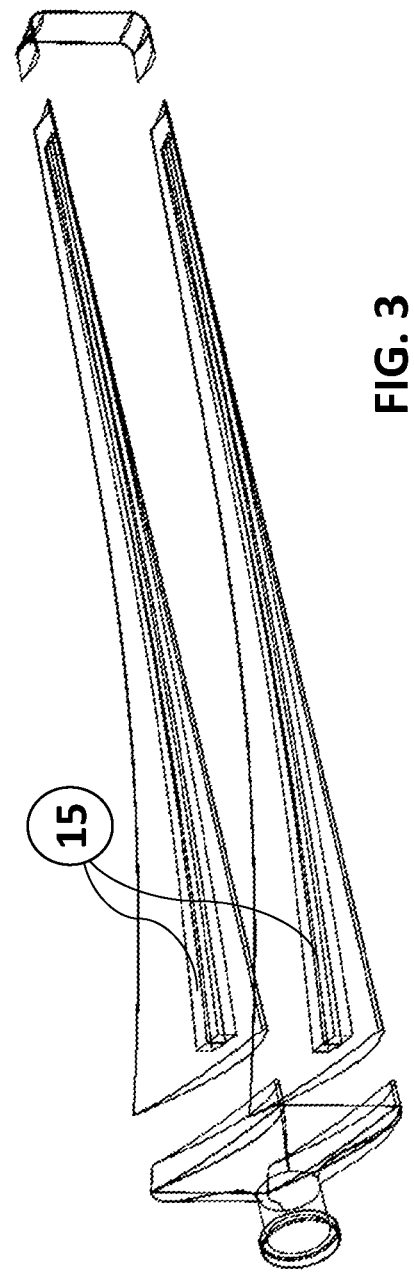
FIG. 3 is a perspective view that shows the exploded mounting appearance and internal structure of the wing.

In FIGS. 2-3, detailed views of the invention are given. The way the profile rods (15) are placed on the inside of the upper wing (13) and the lower wing (14) is as follows: the upper wing forming the upper wing (13) is bent by 35 degrees after the upper profile (131) and the upper wing forming the lower profile (132) are produced. Then, profile rods (15) are placed between the two profiles, glued with epoxy, riveted, and sent dec heat treatment. An analogue of this formed wing profile is also applied to the lower wing (14) in the same way. The twist angle of the lower wing (14) is parallel to the upper wing (13).

In FIG. 1, the torsion (twist) applied to the wing (10) can be clearly seen. The most important point here is that the wing profiles do not twist completely from the handle (11) to the head (12), but only from the handle (11) to the wing length (L) by 90% 35 degrees, and the rest has a flat surface of 0 degree along the length of the wing. As a result of long experimental studies, it has been proven that this is the case where the increase in the amount of air drawn by the wing profiles by the vacuum effect occurs most efficiently.

The profile rod (15) is in the form of twins swing to each other, which minimizes the oscillation effect created by the wings during operation. In addition, due to the fact that the profile rod (15) is designed to be glued side by side, there is no need for filling in the profile, and the mechanical characteristic properties of the material improve after the heat treatment. The main advantage of the material structure being made of UD carbon fiber fabric is that the material is as hard as steel but also flexible. For this reason, it can be integrated without difficulty at the production stage during its integration into the torsional wing structure. The main reason why carbon fiber fabric is UD 0 degree directional is that it exhibits a more rigid behavior against bending compared to +/−45-degree directional ones.

FIG. 4 shows a graph consisting of 15-degree wing profiles with the number TR202008559 belonging to the applicant, which belongs to the known state of the technique, applied over the entire surface of the wing. This analysis method has been applied by considering the cooling towers in the technical field. It has been observed that the air drawn from the bottom of the cooling tower is not equal at all points. It has been observed that the uneven, center-oriented and much higher air flow rate in the wall parts affects the efficiency and the fatigue life of the material is reduced.

FIG. 5 shows a computer-aided air flow graph of the system belonging to our system, which is the subject of the invention. With this new structure created, an equal amount of air flow is drawn from every point of the tower, the speed values are stable and the air flow to the wings is almost equal at every point.

The invention claimed is:

1. A 2-piece axial fan blade designed for a cooling tower, comprising:
   a head,
   a handle part associated with a table, wherein an engine is located on the table,
   an upper wing, comprising an upper wing upper profile and an upper wing lower profile at a first torsion angle, and
   a lower wing, comprising a lower wing upper profile and a lower wing lower profile arranged so that the lower wing has a second torsion angle parallel to the upper wing,
   wherein the upper wing comprises a decoupled twin profile rod fixed between the upper wing upper profile and the upper wing lower profile, and the lower wing upper profile and the lower wing lower profile are parallel to a direction of extension of wing profiles,
   wherein the upper wing upper profile and the upper wing lower profile have the first torsion angle of 35° counterclockwise at a rate of increasing linear velocity from the handle part to the head, and
   wherein for the upper wing, the first torsion angle is 0° after 90% of a wing length of the upper wing.

* * * * *